(12) United States Patent
Diósdi et al.

(10) Patent No.: US 12,704,454 B2
(45) Date of Patent: Aug. 11, 2026

(54) PLATE ASSEMBLY FOR RAPID, AUTOMATIC, HIGH PENETRATION DEPTH EXAMINATION OF SAMPLES WITH A LIGHT-SHEET MICROSCOPE, AS WELL AS A METHOD FOR USING SUCH PLATE ASSEMBLY

(71) Applicants: SINGLE-CELL TECHNOLOGIES KFT., Szeged (HU); HUN-REN SZEGEDI BIOLÓGIAI KUTATÓKÖZPONT, Szeged (HU)

(72) Inventors: Ákos Diósdi, Várpalota (HU); Péter Horváth, Szeged (HU)

(73) Assignees: SINGLE-CELL TECHNOLOGIES KFT., Szeged (HU); HUN-REN SZEGEDI BIOLÓGIAI KUTATÓKÖZPONT, Szeged (HU)

( * ) Notice: Subject to any disclaimer, the term of this patent is extended or adjusted under 35 U.S.C. 154(b) by 59 days.

(21) Appl. No.: 18/875,683

(22) PCT Filed: Jun. 13, 2023

(86) PCT No.: PCT/HU2023/050033
§ 371 (c)(1),
(2) Date: Dec. 16, 2024

(87) PCT Pub. No.: WO2023/242604
PCT Pub. Date: Dec. 21, 2023

(65) Prior Publication Data

US 2025/0369870 A1 Dec. 4, 2025

(30) Foreign Application Priority Data

Jun. 14, 2022 (HU) .................................. P2200213

(51) Int. Cl.
*G01N 21/03* (2006.01)
*G01N 21/64* (2006.01)
*G02B 21/34* (2006.01)

(52) U.S. Cl.
CPC ......... *G01N 21/03* (2013.01); *G01N 21/6452* (2013.01); *G02B 21/34* (2013.01);
(Continued)

(58) Field of Classification Search
CPC .... G02B 21/34; G01N 21/6452; G01N 21/03; G01N 21/11; G01N 21/13; G01N 21/253;
(Continued)

(56) References Cited

U.S. PATENT DOCUMENTS 4,599,315 A * 7/1986 Terasaki ................ B01L 3/5085 422/942
6,074,614 A * 6/2000 Hafeman ............ B01L 3/50853 422/552
(Continued)

FOREIGN PATENT DOCUMENTS

AT 510898 A1 * 7/2012 ......... G01N 21/0303
CN 110133837 A 8/2019
(Continued)

OTHER PUBLICATIONS

International Search Report in corresponding application PCT/HU2023/050033, mailed Oct. 17, 2023; 4 pages.
(Continued)

*Primary Examiner* — Gordon J Stock, Jr.
(74) *Attorney, Agent, or Firm* — Fitch, Even, Tabin & Flannery LLP

(57) ABSTRACT

A plate assembly includes a first sample holder for receiving a plurality of samples, wherein the first sample holder is a transparent foil sheet and includes a plurality of cuvettes configured to receive a sample. A sample fixing plate for
(Continued)

positioning the samples is placed in the cuvettes, wherein the sample fixing plate includes a plurality of inserts to be inserted into the cuvettes such that per cuvette a chamber is formed between the first sample holder and the inserted sample fixing plate. The chamber ensures the structural integrity of a single sample. At least one slot is formed next to each insert to allow the transmission of light emitted by the light-sheet microscope. The sample fixing plate also includes at least two opposite magnets and a sample holder frame for receiving the sample holder and the sample fixing plate fitted to each other. The sample holder frame has a planar flat sheet, which includes at least one receiving element configured to receive the first sample holder and the sample fixing plate inserted therein, wherein the bottom of the receiving element is made of transparent material. The sample holder frame includes a planar flat edge extending around the circumference of the sheet where the dimensions of said edge enable a scanning unit of a lightsheet microscope to operate continuously.

20 Claims, 6 Drawing Sheets

(52) U.S. Cl.
CPC ................ *B01L 2300/0829* (2013.01); *G01N 2021/0357* (2013.01); *G01N 2021/0367* (2013.01)

(58) Field of Classification Search
CPC ....... G01N 21/2806; G01N 2021/6482; G01N 2021/0321; G01N 2021/0357; G01N 2021/0367; G01N 2021/0371; G01N 2021/0375; G01N 2021/115; G01N 2021/135; G01N 2021/0346; G01N 2021/035; G01N 2021/0353; G01N 2021/036; G01N 2021/0364; G01N 2021/0378; G01N 2021/0382; G01N 35/026; B01L 2300/0829
See application file for complete search history.

(56) References Cited

U.S. PATENT DOCUMENTS

| | | | | |
|---|---|---|---|---|
| 7,514,045 | B2 * | 4/2009 | Corcoran | B01L 3/502707 422/503 |
| 8,968,684 | B2 * | 3/2015 | Lian | G01N 21/6452 422/566 |
| 10,831,011 | B2 * | 11/2020 | Jarvius | G01N 21/6452 |
| 2013/0050692 | A1 * | 2/2013 | Tang | B01L 3/50855 356/244 |
| 2013/0300032 | A1 * | 11/2013 | Knebel | B01L 3/50851 264/279 |
| 2016/0170195 | A1 | 6/2016 | Siebenmorgen et al. | |
| 2017/0173586 | A1 * | 6/2017 | Tan | B01L 7/52 |
| 2018/0164569 | A1 | 6/2018 | Brinkman et al. | |
| 2019/0353884 | A1 | 11/2019 | Hedde et al. | |
| 2022/0040689 | A1 * | 2/2022 | Milne | B01L 3/50853 |

FOREIGN PATENT DOCUMENTS

| | | | | |
|---|---|---|---|---|
| DE | 4016617 | A1 | 11/1991 | |
| EP | 3834938 | A1 * | 6/2021 | B01L 3/5085 |
| WO | WO-2009049740 | A1 * | 4/2009 | G02B 21/34 |
| WO | 2015/036589 | A1 | 3/2015 | |
| WO | 2015/184360 | A1 | 12/2015 | |
| WO | WO-2015185341 | A1 * | 12/2015 | B01L 3/50853 |
| WO | 2022/074084 | A1 | 4/2022 | |

OTHER PUBLICATIONS

Written Opinion of the International Searching Authority in corresponding application PCT/HU2023/050033, mailed Oct. 17, 2023; 8 pages.

Hotte et. al., "Ultra-thin fluorocarbon foils optimise multiscale imaging of three-dimensional native and optically cleared specimens"; Scientific Reports, www.nature.com/scientificreports; (2019) 9:17292; https://doi.org/10.1038/s41598-019-53380-2; 13 pages.

* cited by examiner

PLATE ASSEMBLY FOR RAPID, AUTOMATIC, HIGH PENETRATION DEPTH EXAMINATION OF SAMPLES WITH A LIGHT-SHEET MICROSCOPE, AS WELL AS A METHOD FOR USING SUCH PLATE ASSEMBLY

CROSS-REFERENCE TO RELATED APPLICATIONS

This application is the national phase of PCT/HU2023/050033 filed Jun. 13, 2023, which claims priority to Hungarian Patent Application No. P2200213 filed Jun. 14, 2022.

TECHNICAL FIELD

The subject matter of the invention is a plate assembly for rapid, automatic, high penetration depth examination of samples with a light-sheet microscope, as well as a method for using such a plate assembly.

BACKGROUND

Currently, the examination of 3-dimensional or 3D cell cultures (e.g., spheroids, organoids, microtissues, aggregates, etc.) and tissue samples is typically carried out with confocal microscopes, however, the use of light-sheet microscopes is increasingly common to ensure high penetration depth, high imaging speed and low phototoxicity. The applicability of these microscopes for the examination of 3-dimensional cell cultures and tissue samples is strongly influenced by the limited number of such sample holder plates that are accommodate a large number of samples and are compatible with the above systems.

The article "Ultra-thin fluorocarbon foils optimise multiscale imaging of three-dimensional native and optically cleared specimens" published by Hötte et. al in 2009, shows the vacuum forming method of a FEP (Fluorinated Ethylene Propylene) foil. During the vacuum forming, cuvettes are formed, which are suitable for receiving 3-dimensional samples for examining the samples with a fluorescent light-sheet microscope. Using the method described in the article, several cuvettes (3×3 cuvettes) are fabricated for each foil, however, for testing samples, these cuvettes are separated from each other and used separately for the examination of the samples. Furthermore, during the examination of the sample, no element is used that would limit the sample chamber of the cuvette in such a way that it can only receive a single sample, and no means are used to prevent the movement of the samples during the examination.

WO2015184360A1 international patent application discloses a sample preparation device and method, during which a 3-dimensional sample is placed in a tube made of FEP foil, and then a tapered elongated member, also made of FEP foil, is placed in the tube, which limits the size of the sample receiving chamber in the tube. However, during the method, the tube is deformed under pressure against the tapered elongated member, which causes mechanical separation of the sample. The purpose of this solution is to homogenize the samples.

WO2015036589 patent application discloses a cuvette for analysis with an inverted fluorescence microscope or an inverted light-sheet fluorescence microscope, wherein the sample is located at the bottom of the cuvette to illuminate the sample from below. Several cuvettes can be formed in a microtiter plate, which can thus be suitable for the simultaneous examination of several samples. The advantage of the invention is that the sample can be positioned at the bottom of the cuvette through the design of the bottom wall of the cuvette, however, the volume of the cuvette is not limited, so it is not only suitable for receiving one sample at a time. In one embodiment of the invention, the solution includes a frame for receiving and stabilizing several cuvettes, however, this frame is only suitable for receiving several separate cuvettes or non-integrated microtiter plates and does not enable the stabilization of an integrated device. Furthermore, the solution according to this invention does not employ a clamping device to prevent movement of the sample in the cuvette.

None of the above solutions allows the simultaneous examination of several samples with a light-sheet microscope in such a way that only one sample is placed in each sample holder element, whose position is stabilized.

SUMMARY

The aim of the solution according to the invention is to create a plate assembly that is suitable for examining a large number of samples with a light-sheet microscope, wherein a sample is positioned in a specific location in each cuvette in the plate assembly in such a way that neither the sample nor individual parts of the plate assembly can move during the examination. Furthermore, the plate assembly according to the invention can also be used in such a way that, due to the design of the plate assembly, several samples can be continuously examined at the same time, so it is not necessary to reposition and recalibrate a light-sheet microscope.

The aim of the invention is achieved with a plate assembly that is suitable for rapid, automatic examination of samples with a high penetration depth with a light-sheet microscope, said plate assembly comprises:

- a first sample holder for receiving a plurality of samples separated from each other, wherein the first sample holder is a transparent foil sheet and comprises a plurality of cuvettes, wherein each cuvette is configured to receive a sample, wherein the plate assembly further comprises

- a sample fixing plate for positioning the samples placed in the cuvettes, wherein the sample fixing plate comprises a plurality of inserts, which can be inserted into the cuvettes of the first sample holder in such a way that per cuvette a chamber is formed between the first sample holder and the inserted sample fixing plate, said chamber ensures the integrity of the structure of a single sample in the cuvettes of the first sample holder, wherein at least one slot is formed next to each insert to allow the transmission of light emitted by the light-sheet microscope, wherein the sample fixing plate also comprises at least two opposite magnets,
- a sample holder frame for receiving the sample holder and the sample fixing plate fitted to each other, said sample holder frame has a planar flat sheet, which comprises at least one receiving element configured to receive the first sample holder and the sample fixing plate inserted therein, wherein the bottom of the receiving element is made of transparent material, and the sample holder frame comprises a planar flat edge extending around the circumference of the sheet, the dimensions of said edge enable a scanning unit of a light-sheet microscope to operate continuously, wherein the sample holder frame comprises at least two opposite magnets located in the edge, wherein the position of each magnet substantially matches the position of the magnets arranged in the sample fixing plate to connect the magnets to each other and thereby hold the sample fixing plate stable in an inserted position.

Preferably, the plate assembly comprises a second sample holder, which is a transparent foil sheet and comprises a plurality of cuvettes, which can be inserted into the cuvettes of the first sample holder in such a way that per cuvette a chamber is formed between the first sample holder and the second sample holder, said chamber ensures the integrity of the structure of a single sample in the cuvettes of the first sample holder, and wherein each cuvette of the second sample holder is configured to receive each insert of the sample fixing plate.

Preferably, the number of cuvettes of the first sample holder, optionally the number of cuvettes of the second sample holder, and the number of inserts of the sample fixing plate are the same.

The sample holder frame may further comprise a circumferentially extending, protruding side wall, wherein each of at least two opposite parts of the side wall comprises at least one L-shaped groove, and the sample fixing plate comprises fixing tabs arranged opposite each other and/or the plate assembly further comprises a grid clamping element, each of which is suitable for inserting into the grooves and can be fixed stably to press down the sample fixing plate in the inserted position, respectively.

Any of the following can be formed individually from a single piece: the first sample holder, optionally the second sample holder, and the sample fixing plate.

The chamber formed in the cuvettes of the first sample holder can be configured to receive a sample and a mounting medium, cell culture medium and/or hydrogel together.

Preferably, the sample holder frame comprises more than one, preferably two, particularly preferably four receiving elements, the dimensions of said receiving elements correspond to the dimensions of a standard slide, wherein each receiving element is arranged next to each other and separated from each other by a partition wall.

Preferably, the thickness of the bottom of the receiving elements is about 150 μm and is made of a material selected from glass, transparent plastic, transparent resin, or transparent FEP (Fluorinated Ethylene Propylene) foil.

Preferably, the first sample holder and the second sample holder are a transparent foil sheet selected from at least one of the following: ECTFE foil (ethylene-chlorotrifluoroethylene), THV foil (tetrafluoroethylene-hexafluoropropylene-vinylidene fluoride), PFA foil (perfluoroalkoxy), PFA-PG foil, PFA-GK foil, PTFE (polytetrafluoroethylene, Teflon) foil, especially FEP foil, wherein the thickness of the foil sheet is between 25-100 μm, preferably between 5-10 μm, and wherein the first sample holder and second sample holder are formed by vacuum forming.

The sample holder frame can be produced by 3-dimensional printing.

The sample holder frame, except for the bottom of the receiving element, can be made of plastic, resin, and/or metal.

The sample can be a 3-dimensional cell culture or tissue sample.

The aim of the invention is further achieved with a method for the use of a plate assembly according to the invention, comprising the steps of:

in S10, providing a first sample holder having cuvettes and filling each cuvette with a sample stored in mounting medium, cell culture medium, and/or hydrogel, in S20, providing a sample fixing plate having inserts and inserting said inserts into the cuvettes of the first sample holder containing samples, thereby a chamber is formed, which has a volume that ensures the integrity of the structure of a single sample, in S30, providing a sample holder frame having receiving element and placing the sample fixing plate inserted into the first sample holder in said receiving element, thereby assembling the plate assembly, in S40, connecting magnets of the sample fixing plate and magnets of the sample holder frame to stably fix the plate assembly, in S50, inverting the plate assembly in such a way that the cuvettes of the first sample holder element filled with samples face upwards, in S60, illuminating the plate assembly from below with a light-sheet microscope for examining the samples.

The aim of the invention is further achieved with a method for the use of a plate assembly according to the invention, comprising the steps of:

in S100, providing a first sample holder having cuvettes and filling each cuvette with a sample stored in mounting medium, cell culture medium, and/or hydrogel, in S200, providing a second sample holder having cuvettes and inserting said cuvettes into the cuvettes of the first sample holder containing samples, thereby a chamber is formed, which has a volume that ensures the integrity of the structure of a single sample, in S300, providing a sample fixing plate having inserts and inserting said inserts into the cuvettes of the second sample holder, in S400, providing a sample holder frame having receiving element and placing the first sample holder, the second sample holder, and the sample fixing plate in said receiving element, which are aligned one after the other, thereby assembling the plate assembly, in S500, connecting magnets of the sample fixing plate and magnets of the sample holder frame to stably fix the plate assembly, in S600, inverting the plate assembly in such a way that the cuvettes of the first sample holder element filled with samples face upwards, in S700, illuminating the plate assembly from below with a light-sheet microscope for examining the samples.

Preferably, first filling each cuvette of the first sample holder with a mounting medium, cell culture medium, and/or hydrogel, and then filling with a sample.

Preferably, filling each cuvette of the first sample holder with a sample stored in a mounting medium, cell culture medium, and/or hydrogel, manually or with a pipetting robot.

Preferably, the sample is a 3-dimensional cell culture or tissue sample.

The aim of the invention is further achieved with a method for the use of a plate assembly according to the invention, comprising the steps of:

in S7, providing a first sample holder having cuvettes and sterilizing it, in S8, filling the cuvettes of the sterilized first sample holder with sample-forming material and optionally with cell culture medium, in S9, placing the first sample holder in an incubator, wherein the cuvettes of which are filled with sample-forming material and optionally with cell culture medium, until obtaining a sample, then sequentially performing steps S20-S60 or S200-S700.

The sample-forming material may comprise single cells in a cell culture medium or hydrogel, or one or more small cell aggregates.

The sample can be a 3-dimensional cell culture of living cells.

Preferably, performing steps S7-S9 in a sterile environment.

Preferably, simultaneously using several receiving elements of the sample holder frame for continuous examination of the samples, without recalibration of the light-sheet microscope.

The method according to the invention may comprise the following step:

in S41 or S510, before inverting the plate assembly, sliding and stably securing fixing tabs of the sample fixing plate, and/or grid clamping element into the L-shaped grooves formed on side walls of the sample holder frame.

Preferably, producing the first sample holder, and optionally the second sample holder from a FEP (fluorinated ethylene propylene) foil by vacuum forming.

The sample can be a 3-dimensional cell culture of living cells.

Preferably, producing the sample holder frame by 3-dimensional printing.

BRIEF DESCRIPTION OF THE DRAWINGS

Hereinafter, the preferred exemplary embodiments of the invention are described with the help of the accompanying drawing. In the drawing.

DETAILED DESCRIPTION

Figure 1:
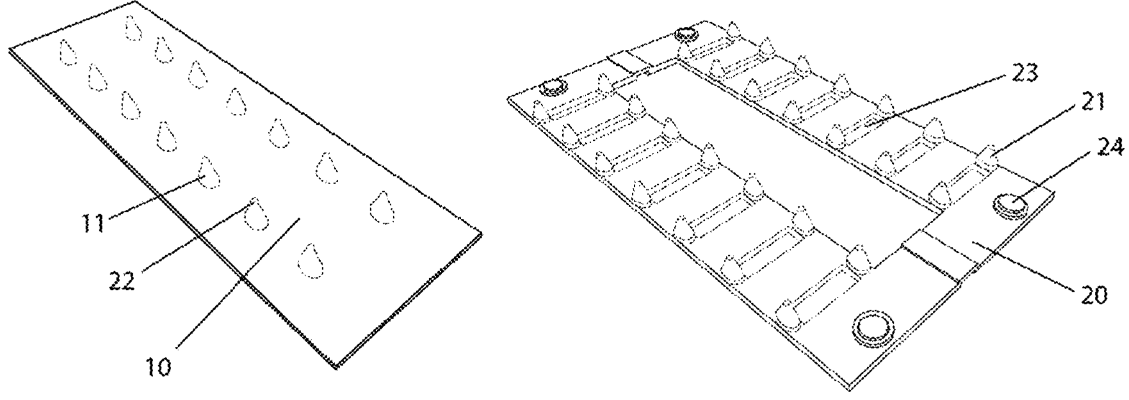
FIG. 1 is a perspective view of the first sample holder and the sample fixing plate of the plate assembly according to the invention, which are separated from each other.

FIG. 1 shows a first sample holder 10 and a sample fixing plate 20 of a plate assembly 1 according to the invention in a perspective view, wherein the first sample holder 10 and the sample fixing plate 20 are separated from each other for better visibility of each element. The plate assembly 1 comprises a first sample holder 10, a sample fixing plate 20, and a sample holder frame 30 for rapid, automatic, high penetration depth examination of samples 12 with a light-sheet microscope. The samples 12 are 3-dimensional samples, preferably 3-dimensional cell cultures, optionally 3-dimensional cell cultures with living cells. The samples 12 can also be tissue samples previously removed from a patient or cultured tissue samples.

The first sample holder 10 is a transparent foil sheet with a plurality of cuvettes 11, wherein the cuvettes 11 are configured in such a way that one cuvette 11 is suitable for receiving a single sample 12, which is not shown in this figure. In this case, the sample 12 can be filled into a cuvette 11, not by itself, but stored in a mounting medium, other suitable cell culture medium, and/or hydrogel, for the purpose of examining the sample 12 with a light-sheet microscope. The cuvettes 11 are preferably first filled with mounting medium, cell culture medium, hydrogel or a combination thereof, and then one sample 12 is placed therein. This solution is particularly advantageous in the case of 3-dimensional samples 12 of living cells. The cuvettes 11 can also be filled in such a way that the samples 12 already stored in the mounting medium, cell culture medium, and/or hydrogel are placed together in the cuvettes 11.

The sample fixing plate 20 comprises a plurality of inserts 21, which can be inserted into the cuvettes 11 of the first sample holder 10. The volume of the cuvettes 11 in itself would be suitable for receiving several samples 12 at the same time, however, in the plate assembly 1 according to the invention, the first sample holder 10 is always connected to the sample fixing plate 20 and is used in this way. When using the plate assembly 1, the inserts 21 of the sample fixing plate 20 are inserted into the cuvettes 11 of the first sample holder 10 in such a way that between the first sample holder 10 and the inserted sample fixing plate 20, a chamber 22 is formed in the cuvettes 11 of the first sample holder 10, wherein for each cuvette 11, the volume of said chamber 22 ensures the integrity of the structure of 12 samples stored in a specific medium. The inserted inserts 21 of the sample fixing plate 20 determine, on the one hand, the volume of the chamber 22, which is suitable for receiving a single sample 12, and, on the other hand, the position of the sample 12 in the cuvette 11. The first sample holder 10 and sample fixing plate 20 which are fitted together are shown in side view in FIGS. 6A and 6B.

At least one slot 23 is formed next to each insert 21 of the sample fixing plate 20, said slot 23 is formed between the two adjacent inserts 21 shown in FIG. 1. The slot 23 ensures the passage of the light emitted by the light-sheet microscope, which is thus able to illuminate the sample 12 in the cuvette 11. The sample fixing plate 20 also comprises at least two magnets 24 arranged opposite each other. In the embodiment according to FIG. 1, two magnets 24 arranged opposite each other together with the magnets 35 of a sample holder frame 30 (not shown in FIG. 1) serve to prevent the inserted sample fixing plate 20 from slipping.

Figure 2:
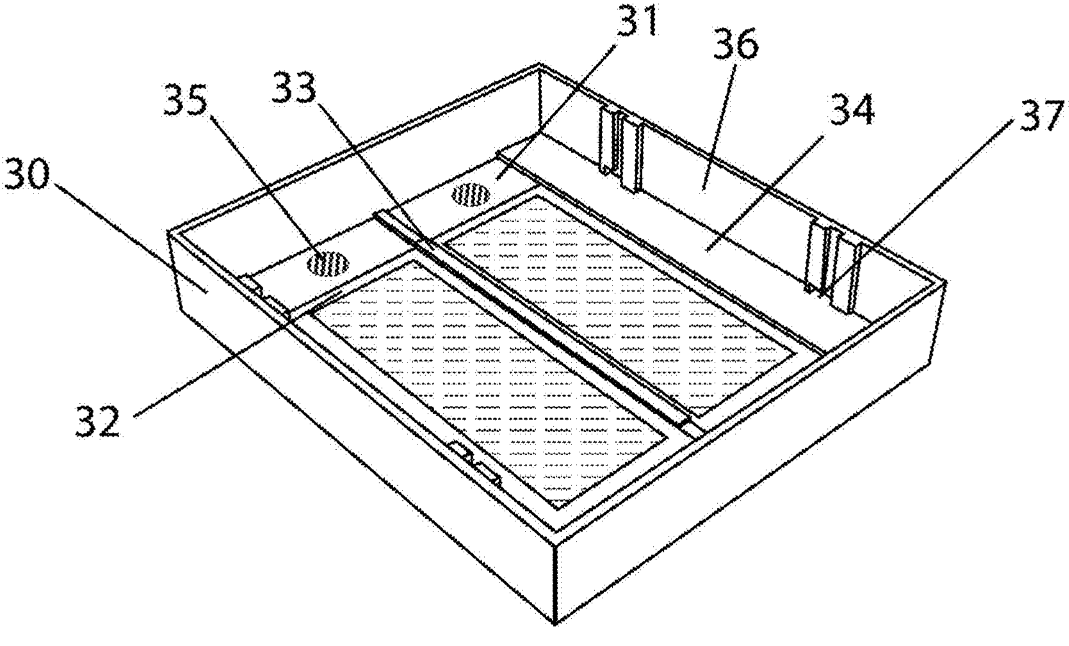
FIG. 2 shows a preferred embodiment of the sample holder frame of the plate assembly according to the invention in a perspective view.
Figure 3:
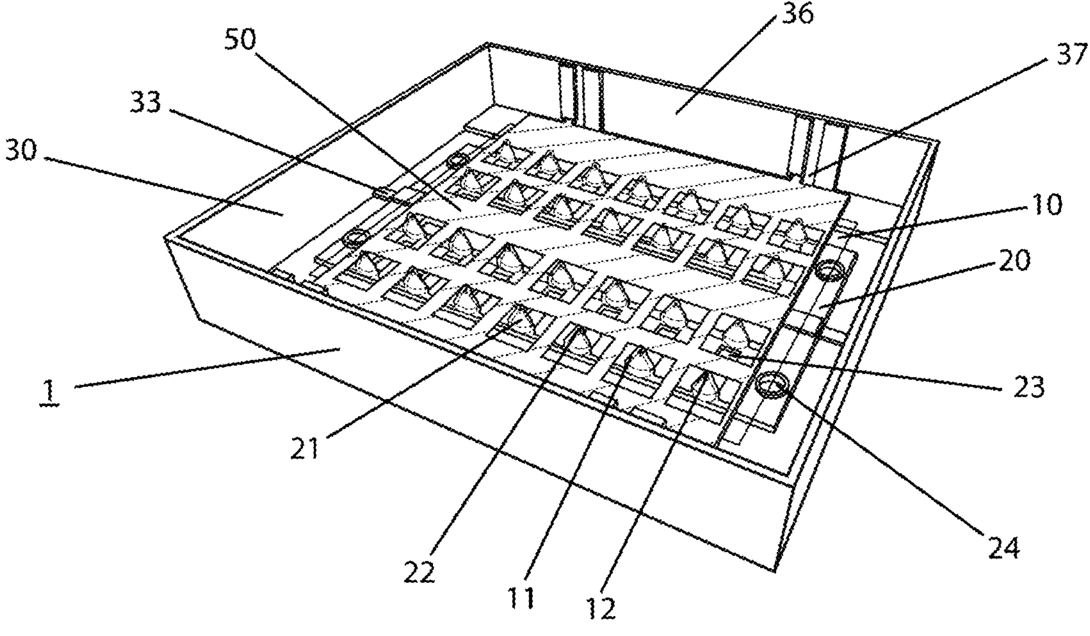
FIG. 3 shows the plate assembly according to the invention in a perspective view, wherein the first sample holder, sample fixing plate and grid clamping element are connected to each other.

FIG. 2 shows a preferred embodiment of the sample holder frame 30 of the plate assembly 1 according to the invention in a perspective view. The aim of the sample holder frame 30 is to receive the sample holder 10 and the sample fixing plate 20, which are in a nested position. This assembly is shown in FIG. 3. The sample holder frame 30 comprises a flat sheet 31 arranged in a plane, which substantially corresponds to the bottom of the sample holder frame 30. The sheet 31 comprises at least one receiving element 32, which is configured to receive the sample holder 10 and the sample fixing plate 20 inserted therein, wherein the bottom of the receiving element 32 is made of transparent material to provide a free path for the light of the light-sheet microscope to the samples 12. The material of the bottom of the receiving element 32 can be transparent plastic, transparent resin, transparent FEP (fluorinated ethylene-propylene) foil, or particularly preferably glass, the thickness of which can be about 150 μm, thus allowing the transmission of light. Except for the bottom of the receiving element 32, the sample holder frame 30 can be made of plastic, resin, and/or metal, and can preferably be produced by 3-dimensional printing. The sample holder frame 30 according to FIG. 2 comprises two receiving elements 32, however, the sample holder frame 30 may also comprises more than one, preferably two, particularly preferably four receiving elements 32 arranged next to each other, which are separated from each other by a partition wall 33. The dimensions of the receiving element 32 may correspond to the dimensions of a standard slide.

The sample holder frame 30 according to FIG. 2 comprises a planar flat edge 34 that extends around the circumference of the sheet 31. The flat design of the edge 34 ensures, on the one hand, the gap-free and liquid-tight fitting of the sample holder 10 and the sample fixing plate 20 inserted therein into the receiving element 32, and, on the other hand, after proper positioning of a light-sheet microscope, the dimensions of the flat edge 34 allow the scanning unit of said light microscope to operate continuously. This essentially means that the flat edge 34 formed in the sheet 31, around the receiving element 32 or the receiving elements 32, has dimension compatible with the unit for scanning the samples 12 of a light-sheet microscope, i.e. with the unit that ensures the reflection of the light emitted by the light-sheet microscope and the direction of the light to the samples 12, so that in the case of more samples 12 to be examined, there is no need to interrupt the operation of the light-sheet microscope, and then reposition and recalibrate the microscope. The scanning unit of the light-sheet microscope preferably uses a so-called twin-mirror ("Twin-Fleckt mirror") technology or two objectives, wherein the two mirrors or two objectives are arranged at an angle of 45 degrees or 90 degrees to each other, so that the light emitted by the microscope is deflected at an angle of 45 or 90 degrees, thus enabling the examination of samples 12 in a horizontal direction.

The sample holder frame 30 also comprises at least two oppositely arranged magnets 35, which are placed in the flat sheet 31. In the case of the embodiment according to FIG. 2, the sample holder frame 30 comprises four magnets 35, two of which are arranged opposite each other, but the figure only shows two magnets 35 located on one side of the sample holder frame 30. The position of the individual magnets 35 substantially matches with the position of the magnets 24 arranged in the sample fixing plate 20 to ensure the connection of the magnets 24, 35 with each other. The magnets 24, 35 of the sample holder frame 30 according to FIG. 2 and the sample fixing plate 20 according to FIG. 1 are designed to connect to each other.

The sample holder frame 30 according to FIG. 2 also comprises a circumferentially extending, protruding side wall 36. Each of at least two opposite parts of the side wall 36 according to the invention comprises at least one L-shaped groove 37. The sample holder frame 30 according to FIG. 2 comprises two L-shaped grooves 37 provided on both opposite sides of the peripheral side wall 36, wherein two L-shaped grooves 37 are arranged next to each other on each side. If the sample holder frame 30 comprises L-shaped grooves 37, then the sample fixing plate 20 comprises fixing tabs arranged opposite each other, and/or the plate assembly 1 comprises a grid clamping element 50 (which is not shown in FIG. 2), which can be slid into the L-shaped groove 37 and it can be fixed in it, thus ensuring the stability of the plate assembly 1, i.e. ensuring the non-slip position of the 10 sample holder elements and 20 sample holder plates fitted together in the receiving element 32 of the sample holder frame 30 (see FIG. 3).

FIG. 3 is a perspective view of the assembled plate assembly 1 according to the invention with a grid clamping element 50. FIG. 3 shows the sample holder 10 and the sample fixing plate 20 according to FIG. 1, as well as the sample holder frame 30 according to FIG. 2, which are joined together, wherein the grid clamping element 50 is placed on top of these elements and pushes down said elements. In the embodiment according to FIG. 3, the sample holder 10 comprises 14-14 pieces of cuvettes 11 and the sample fixing plate 20 correspondingly comprises 14-14 pieces of inserts 21, which are inserted into the cuvettes 11, so this arrangement is suitable for testing a total number of 28 pieces of samples 12. The fitted cuvettes 11 and inserts 21 are placed in two receiving elements 32 arranged next to each other, wherein 14 pieces of fitted cuvettes 11 and inserts 21 are placed in each receiving element, in such a way that the pairs of cuvettes 11 and inserts 21 is in an upward position, so that due to the transparent bottom of the receiving element 32, a light-sheet microscope can illuminate each sample 12 from below. In addition to illumination from below with 20) a standard light-sheet microscope, the plate assembly according to the invention can also be suitable for use with an inverse light-sheet microscope. When an inverse light-sheet microscope is used, the pairs consisting of cuvettes 11 and inserts 21 inserted into each other are in a downward position, but the samples 12, which are also fixed in their respective positions, are illuminated from below. Furthermore, the assembly according to the invention can be suitable for use with any light-emitting microscopes capable of illuminating the samples 12 from below. Such an additional application can be, for example, an application with a single-objective light sheet microscope, wherein it is possible to illuminate the samples 12 from below, regardless of the position of the plate assembly 1. In FIG. 3, only the magnets 24 of the sample fixing plate 20 are visible from above, which are connected to the magnets 35 of the sample holder frame 30 in the same position (not shown in the FIG. 3), thus ensuring the stability of the plate assembly 1 to complement the 30 stabilization provided by the grid clamping element 50. The preferred embodiment according to FIG. 3 also comprises a grid clamping element 50, which is slid into four L-shaped grooves 37 of the sample holder frame 30 and fixed therein to secure the clamping of the assembled first sample holder element 10 and the sample holder plate 20 onto the sample holder frame 30. The sample fixing plate 20 may comprises fixing tabs (not shown in the FIG. 3), which, when slid into the L-shaped groove 37, may also be suitable for stabilizing the plate assembly 1. Optionally, the fixing tabs of the sample fixing plate 20 and the grid clamping element 50 can also be used together.

A preferred embodiment of the plate assembly 1 also comprises a second sample holder 40 (not shown in the FIG. 3), which is a transparent foil sheet and comprises a plurality of cuvettes 41, which can be inserted into the cuvettes 11 of the first sample holder 10 in such a way that a chamber 42 ensuring the integrity of the structure of a single sample 12 is formed between the first sample holder 10 and the second sample holder 40, in the cuvettes 11 of the first sample holder 10. In this case, the second sample holder 40 takes over the role of the sample fixing plate 20 to form the chamber 42 capable of receiving a single sample 12 in each cuvette 11 of the first sample holder 10. In this case, the chamber 42 is formed between two transparent foil sheets, the material of which is selected from at least one of the following: ECTFE foil (ethylene-chlorotrifluoroethylene), THV foil (tetrafluoroethylene-hexafluoropropylene-vinylidene fluoride), PFA foil (perfluoroalkoxy), PFA-PG foil, PFA-GK foil, PTFE (polytetrafluoroethylene, Teflon) foil, especially FEP (fluorinated ethylene propylene) foil. This embodiment is particularly preferable in the case that the sample 12 is a 3-dimensional sample of living cells since the foil material is not toxic to living cells. The thickness of the foil sheet is between 25-100 μm, preferably between 5-10 μm. The first sample holder 10 and the second sample holder 40, especially their cuvettes 11, 41, can preferably be formed by vacuum forming. Furthermore, each cuvette 41 of the second sample holder 40 is configured to receive each insert 21 of the sample fixing plate 20. This means that the inserts 21 of the sample holder 20 can also be inserted into the cuvettes 41 of the second sample holder 40 inserted into the cuvettes 11 of the first sample holder 10, so that three elements are inserted one after the other. Although the chamber 42 capable of receiving samples 12 is formed by the first sample holder 10 and the second sample holder 40, but the sample fixing plate 20 is needed to stably fix them in the sample holder frame 30. Preferably, the number of cuvettes 11 of the first sample holder 10, the number of cuvettes 41 of the second sample holder 40, and the number of inserts 21 of the sample fixing plate 20 are the same. Preferably, each of the following elements is integrally formed from a single piece, separately: the first sample holder 10, optionally the second sample holder 40, as well as the sample fixing plate 20.

Figure 4:
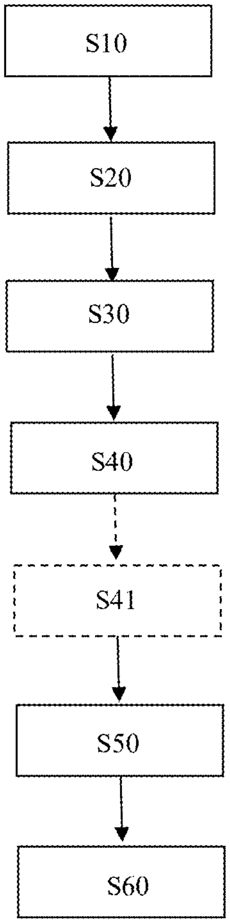
FIG. 4 shows a flow diagram of a method according to the invention for the use of an embodiment of the plate assembly.

FIG. 4 shows a flow diagram of a method according to the invention for the use of one embodiment of the plate assembly 1, which embodiment is shown in FIG. 3. The method according to FIG. 4 comprises:

- in step 10, providing a first sample holder 10 having cuvettes 11 and filling each cuvette 11 with a sample 12 stored in mounting medium, cell culture medium, and/or hydrogel
- in step 20, providing a sample fixing plate 20 having inserts 21 and inserting said inserts 21 into the cuvettes 11 of the first sample holder 10 containing samples 12, thereby a chamber 22 is formed, which has a volume that ensures the integrity of the structure of a single sample 12,
- in step 30, providing a sample holder frame 30 and placing the sample fixing plate 20 inserted into the first sample holder 10 in a receiving element 32 of the sample holder 30, thereby assembling the plate assembly 1,
- in step 40, connecting magnets 24 of the sample fixing plate 20 and magnets 35 of the sample holder frame 30 to stably fix the plate assembly 1,
- in step 50, inverting the plate assembly 1 in such a way that the cuvettes 11 of the first sample holder element 10 filled with samples 12 face upwards, and
- in step 60, illuminating the plate assembly 1 from below with a light-sheet microscope for examining the samples 12.

Figure 5:
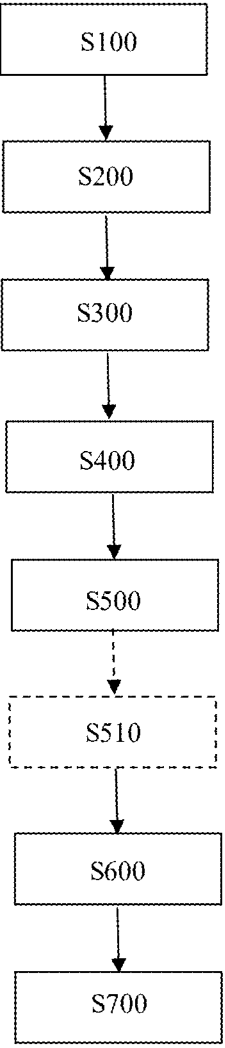
FIG. 5 shows a flow diagram of a method according to the invention for the use of a further embodiment of the plate assembly.

FIG. 5 shows a flow diagram of a method according to the invention for the use of an embodiment of the plate assembly 1, wherein the plate assembly 1 comprises a first sample holder 10, a second sample holder 40, a sample fixing plate 20 and a sample holder frame 30. The method according to FIG. 5 comprises:

- in step 100, providing a first sample holder 10 having cuvettes 11 and filling each cuvette 11 with a sample 12 stored in mounting medium, cell culture medium, and/or hydrogel,
- in step 200, providing a second sample holder 40 having cuvettes 41 and inserting said cuvettes 41 into the cuvettes 11 of the first sample holder 10 containing samples 12, thereby a chamber 42 is formed, which has a volume that ensures the integrity of the structure of a single sample 12,
- in step 300, providing a sample fixing plate 20 having inserts 21 and inserting said inserts 21 into the cuvettes 41 of the second sample holder 40,
- in step 400, providing a sample holder frame 30 and placing the first sample holder 10, the second sample holder 40, and the sample fixing plate 20 in a receiving element 32 of the sample holder frame 30, which are aligned one after the other, thereby assembling the plate assembly 1,
- in step 500, connecting magnets 24 of the sample fixing plate 20 and magnets 35 of the sample holder frame 30 to stably fix the plate assembly 1,
- in step 600, inverting the plate assembly 1 in such a way that the cuvettes 11 of the first sample holder element 10 filled with samples 12 face upwards,
- in step 700, illuminating the plate assembly 1 from below with a light-sheet microscope for examining the samples 12.

In the case of the methods according to FIGS. 4 and 5, preferably at least the first 10 sample holder is sterilized, particularly preferably that parts of the plate assembly 1 in direct contact with the sample 12 are sterilized. Sterilization can be done with UV light, disinfecting washing, for example with alcohol washing, ultrasonic cleaning, or any other disinfecting method that does not create conditions, especially temperature changes, that could cause damage or distortion in the material of the plate assembly 1.

In both the methods according to FIGS. 4 and 5, it is possible to use several receiving elements 32 of the sample holder frame 30 simultaneously for continuous examination of the samples 12, without recalibration of the light-sheet microscope. The flat edge 34 of the sample holder frame 30 enables the uninterrupted operation of the light-sheet microscope.

The methods according to FIGS. 4 and 5 show the application of an advantageous embodiment of the plate assembly 1, wherein each method can be supplemented with the following optional method steps:

- in step S41 for the method according to FIG. 4, and in step S510 for the method according to FIG. 5, before inverting the plate assembly 1, sliding and stably securing fixing tabs of the sample fixing plate 20, and/or grid clamping element 50 into the L-shaped grooves 37 formed on side walls 36 of the sample holder frame 30, thereby also ensuring the stability of the plate assembly 1.

In the methods described above, each cuvette 11 of the first sample holder 10 is preferably first filled with a mounting medium, cell culture medium, and/or hydrogel and then filled with a sample 12 each. Furthermore, during the method described above, individual cuvettes 11 of the first sample holder 10 can be filled with samples 12 manually or with a pipetting robot, wherein each sample 12 stored in a mounting medium, cell culture medium, and/or hydrogel can be filled into the cuvettes 11 of the first sample holder 10. As previously defined, the cuvettes 11 by themselves without the insertion of the inserts 21 of the sample fixing plate 20 or, optionally, without the insertion of the cuvettes 41 of the second sample holder 40 can be suitable for receiving several samples 12 at the same time. However, the insertion of the inserts 21 or, optionally, the cuvettes 41 forms chambers 22 or 42 with specific dimensions, which ensures damage-free storage of a single sample 12. In the event that more than one sample 12 is filled into a single cuvette 11 during the filling of the cuvettes 11, the insert 21 or the cuvette 41 will destroy these several samples after their insertion, since the volume of the chamber 22 or 42 is only suitable for receiving a single sample 12. Then, when examining with a light-sheet microscope, said single 11 cuvette comprising several 12 samples can be interpreted as "waste" or "error" and is not suitable for evaluation, so there cannot be a case where a given 12 sample cannot be accurately identified during the microscopic examination.

In the previously described methods, the first sample holder 10 and the second sample holder 40, especially the cuvettes 11 and 41, are preferably made from a FEP (fluorinated ethylene propylene) foil by vacuum forming.

In the method according to FIG. 5, 3-dimensional cell culture of living cells is preferably used as sample 12, since the material of the foil, which is preferably FEP foil, is not toxic to living cells.

In both the methods according to FIGS. 4 and 5, the sample holder frame 30 is preferably produced by 3-dimensional printing.

The solution according to the invention can also comprise a method which essentially modifies the method according to FIGS. 4 and 5 in such a way that instead of step S10 or S100, it comprises the following method steps:

in step S7, providing a first sample holder 10 having cuvettes 11 and sterilizing it. Sterilization can be done in the manner mentioned earlier, i.e., any sterilization can be used that does not damage or distort the material or shape of the plate assembly 1, in this step the material and shape of the first sample holder 10.

In step S8, filling the cuvettes 11 of the sterilized first sample holder 10 with a sample forming material 9 and optionally a cell culture medium. The sample forming material 9 can be a cell suspension, i.e., single cells in a cell culture medium, or one or more small cell aggregates in a cell culture medium. The sample-forming material 9 can also be several single cells placed in a hydrogel, or one or more small cell aggregates placed in a hydrogel. In step S8, filling an amount of sample-forming material 9 and optionally cell culture medium corresponding to the volume of the cuvettes 11, which is preferably approximately 2-15 μl in total. The cuvettes 11 can be filled on the one hand by first filling the cell culture medium, and/or hydrogel, and then the single cells and one or more small cell aggregates. The cell culture medium ensures the growth of the cells, which is necessary for the growth of the samples 12. On the other hand, the filling can also be done by filling single cells, or one or more small cell aggregates with the cell culture medium, and/or hydrogel into the cuvettes 11 at the same time. The cuvettes 11 can be filled manually or with the help of a pipetting robot.

In step S9, placing the first sample holder 10 having cuvettes 11 filled with sample forming material 9 and cell culture medium in an incubator until a sample 12 is obtained. In this case the samples 12 are a 3-dimensional cell culture of living cells. The dimensions of the appropriate size samples 12 grown in steps S7-S9 allow steps S20 or S200 to be performed, i.e., the volume of chamber 22 or 42 is suitable to ensure the integrity of the structure of the grown single sample 12. In step S9, the general methods required for the growth of a given sample 12 are applied, which are not described in detail. The sample 12 grown in steps S7-S9 are substantially of a size corresponding to the size of the sample 12 used in steps S10 or S100. The samples 12 having suitable size can be grown primarily—by choosing the appropriate environmental conditions—by selecting the number of single cells or the amount of one or more cell aggregates in the sample-forming material 9 in accordance with the volume of the cuvette 11, as well by adjusting the incubation time to the rate of cell growth. Accordingly, in the case of a larger number of single cells, or a larger size cell aggregate, or a larger number of small cell aggregates, samples 12 of appropriate size can be obtained with a shorter incubation time. If the number of single cells is lower, or the size of a cell aggregate is smaller, or the number of several small cell aggregates is lower, a longer incubation time may be required to reach the samples 12 having appropriate size. It is necessary to choose the above parameters in a way that takes into account the volume of the cuvettes 11.

After steps S7-S9, as soon as the 12 sample is obtained, performing the previously described steps S20-S60, or steps S200-S700 one after the other.

The use of hydrogel in steps S7-S9 can be particularly advantageous, since the gelatinous substance of the hydrogel is suitable for fixing the position of the sample 12. In this case, it is not absolutely necessary to perform the preferred steps S41 or S510.

In steps S7-S9 presented above, the cell culture is substantially carried out in the plate assembly 1, in contrast to the steps S10 or S100, wherein the already cultured or available samples 12 are filled into the cuvettes 11. The drawing of the method including the steps S7-S9 is not presented in the present document. The method including the cell culture steps can be used for all embodiments of the plate assembly 1 since the material of the plate assembly 1 does not damage the single cells or aggregates in the sample-forming material 9, or the sample 12, so it may even be suitable for long-term use.

Steps S7-S9 are preferably performed in a sterile environment, such as a biological safety cabinet.

Figures 6A, 6B:
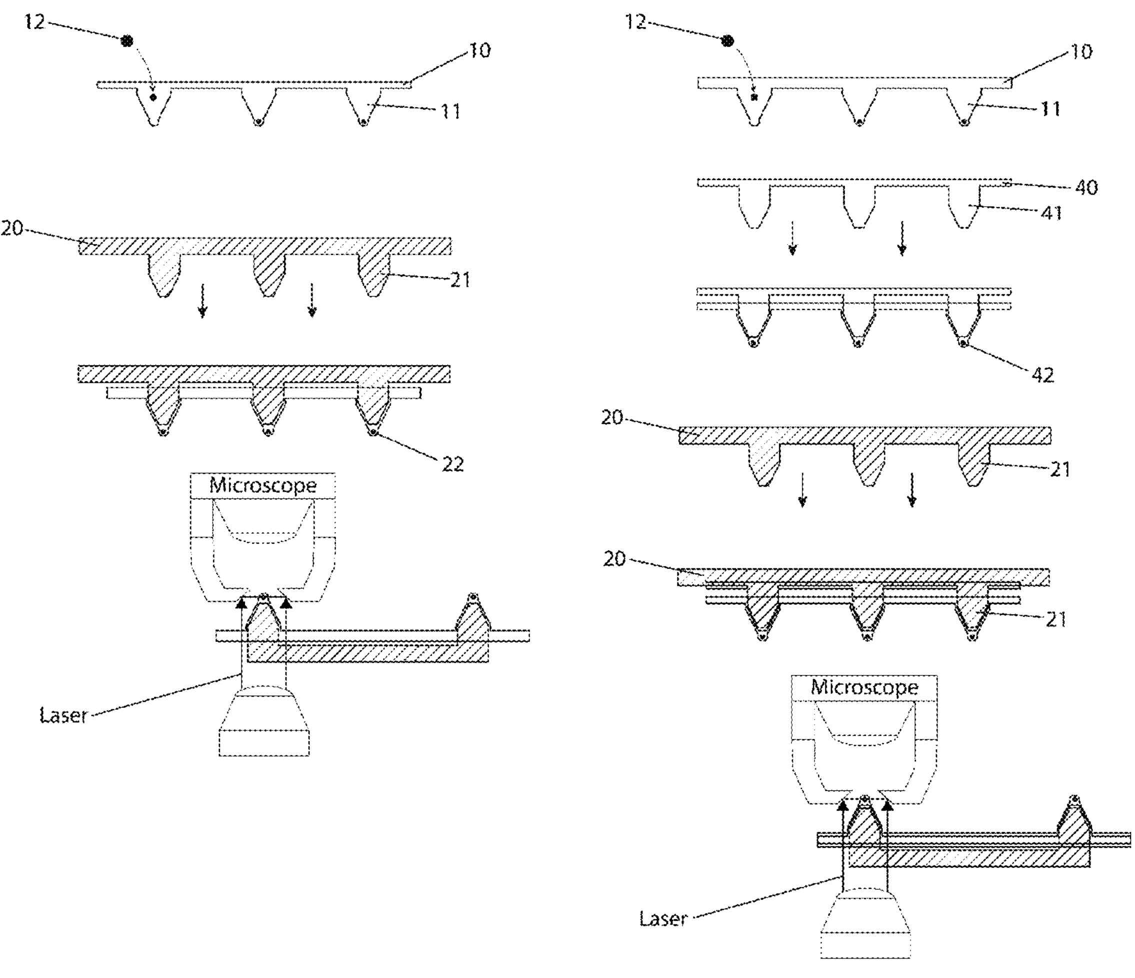
FIGS. 6A and 6B show the application of the solution according to the invention with a light-sheet microscope in a side view, with two different embodiments of the plate assembly, respectively.

FIGS. 6A and 6B show the use of the solution according to the invention with a light-sheet microscope for two embodiments of the plate assembly 1, in side view. The plate assembly 1 according to FIG. 6A comprises a first sample holder 10 and a sample fixing plate 20, wherein the first sample holder 10 comprises cuvettes 11, and the sample fixing plate 20 comprises inserts 21, in the exemplary embodiment shown in FIG. 6A, a single sample 12 is filled into a cuvette 11, and then the inserts 21 are inserted into the cuvettes 11, including the cuvette 11 with the sample 12, thus forming a chamber 22. Then the assembled arrangement is turned over so that it is placed in this inverted position into the scanning unit of the light-sheet microscope. The sample 12 is examined with the light emitted by the light-sheet microscope, i.e., with laser light, which illuminates the sample 12 so that the laser light is reflected from the scanning unit, thus mapping the structure of the sample 12.

The plate assembly 1 according to FIG. 6B comprises a first sample holder 10, a second sample holder 40 and a sample fixing plate 20, wherein the first sample holder 10 comprises cuvettes 11, the second sample holder 40 comprises 41 cuvettes, and the sample fixing plate 20 comprises inserts 21. In this plate assembly 1, a single sample 12 is filled into a cuvette 11, and then the cuvettes 41 are inserted into the cuvettes 11, including the cuvette 11 with the samples 12, thus forming a chamber 42. Inserts 21 are then inserted into this assembled arrangement in such a way that the inserts 21 are in direct contact with the cuvettes 41, but they are not in direct contact with the cuvettes 11 and thus with the sample 12 either. Then the assembled arrangement is turned over and placed in this inverted position in the scanning unit of the light-sheet microscope. The laser light emitted by the light-sheet microscope can also determine the structure of the sample 12 as shown in FIG. 6A.

The advantage of using the plate assembly according to the invention is that it is suitable for the simultaneous examination of a large number of 3-dimensional cell cultures, including 3-dimensional cell cultures of living cells, as well as tissue samples in such a way that the light-sheet microscope does not need to be repositioned and recalibrated, so a large number of samples of the same quality can be examined in a shorter time and with fewer errors.

The advantage of the plate assembly according to the invention is that the slippage of the samples and the individual elements is doubly ensured, on the one hand, by the magnetic fixation of the sample fixing plate and sample holder frame, and on the other hand, by the use of the fixing tabs, and/or grid clamping element. Stabilizing the plate assembly also greatly reduces the chance of poor-quality recordings.

A pair of joined cuvette and insert, or optionally an arrangement of joined cuvette-cuvette-insert of the plate assembly according to the invention creates a chamber with a volume suitable for receiving a single 3-dimensional sample, so that the structure of a single sample per cuvette can be examined simultaneously during the test.

The plate assembly according to the invention can be used with a light-sheet microscope for the rapid, automatic examination of 3-dimensional samples with a high penetration depth and low phototoxicity. Particularly preferably, it can be used with a light-sheet microscope that uses "Twin-Flect mirror" technology to scan the samples.

The plate assembly according to the invention can comprises several cuvettes for the samples in different arrangements, preferably in an arrangement that provides sufficient space for the multi-channel manual or robotic pipetting unit. The embodiments described in the above figures are only preferred embodiments, the plate assembly according to the invention is not limited to these embodiments.

The invention claimed is:

1. A plate assembly (1) for rapid, automatic, high penetration depth examination of samples (12) with a light-sheet microscope having a scanning unit, wherein the plate assembly (1) comprises:

a first sample holder (10) configured to receive a plurality of samples (12) separated from each other, the first sample holder (10) being a transparent foil sheet and comprising a plurality of cuvettes (11) individually configured to receive a single one of the plurality of samples (12), a sample fixing plate (20) configured to position the plurality of samples (12) placed in the cuvettes (11), wherein the sample fixing plate (20) comprises a plurality of inserts (21) configured to be individually insertable into one of the cuvettes (11) of the first sample holder (10) in such a way that a chamber (22) is formed between the first sample holder (10) and the inserted sample fixing plate (20) in individual ones of the cuvettes (11), the chamber (22) being configured to ensure integrity of a structure of a single sample (12) in a respective individual one of the cuvettes (11) of the first sample holder (10), wherein at least one slot (23) is formed next to each insert (21) to allow transmission of light emitted by a light-sheet microscope, the sample fixing plate (20) further comprising at least two opposite sample fixing plate magnets (24), a sample holder frame (30) configured to receive the sample holder (10) and the sample fixing plate (20) fitted to each other, the sample holder frame (30) having a planar flat sheet (31), which comprises at least one receiving element (32) configured to receive the first sample holder (10) and the sample fixing plate (20) inserted therein, wherein a bottom of the receiving element (32) is made of transparent material, the sample holder frame (30) comprising a planar flat edge (34) extending around a circumference of the planar flat sheet (31), wherein dimensions of the planar flat edge (34) are configured to allow a scanning unit of the light-sheet microscope to operate continuously, wherein the sample holder frame (30) further comprises at least two opposite holder frame magnets (35) located in the planar flat edge (34), wherein individual ones of the at least two opposite holder frame magnets (35) in the edge (34) have a position substantially matching a position of one of the at least two opposite sample fixing plate magnets (24) arranged in the sample fixing plate (20) to connect to each other and thereby hold the sample fixing plate (20) stable in an inserted position.

2. The plate assembly (1) according to claim 1, wherein the sample holder frame (30) further comprises a circumferentially extending, protruding side wall (36), wherein at least two opposite parts of the side wall (36) comprises at least one L-shaped groove (37), and the sample fixing plate (20) comprises fixing tabs arranged opposite each other and/or the plate assembly (1) further comprises a grid clamping element (50), either of which is suitable for inserting into the at least one L-shaped groove (37) and can be fixed stably to press down the sample fixing plate (20) in the inserted position, respectively.

3. The plate assembly (1) according to claim 1, wherein each individual chamber (22, 42) formed in the cuvettes (11) of the first sample holder (10) is configured to receive a sample (12) and a mounting medium, cell culture medium and/or hydrogel together.

4. The plate assembly (1) according to claim 1, wherein the sample holder frame (30) comprises more than one receiving element (32) with dimensions that correspond to dimensions of a standard slide, wherein individual ones of the more than one receiving element (32) are arranged next to each other and separated from each other by a partition wall (33).

5. The plate assembly (1) according to claim 1, wherein a thickness of the bottom of the receiving elements (32) is about 150 μm and is made of a material selected from a group consisting of: glass, transparent plastic, transparent resin, or transparent FEP (Fluorinated Ethylene Propylene) foil.

6. The plate assembly (1) according to claim 1, wherein the sample holder frame (30), except for the bottom of the receiving element (32), is made of plastic, resin, and/or metal.

7. The plate assembly (1) according to claim 1, wherein the sample (12) is a 3-dimensional cell culture or tissue sample.

8. A method of using the plate assembly (1) according to claim 1, comprising the steps of:

providing (S10) the first sample holder (10) and filling the plurality of cuvettes (11) with a sample (12) stored in mounting medium, cell culture medium, and/or hydrogel, providing (S20) the sample fixing plate (20) and inserting individual ones of the plurality of inserts (21) into individual ones of the plurality of cuvettes (11) of the first sample holder (10) containing samples (12), thereby forming the chamber (22) having a volume that ensures integrity of the structure of the single sample (12), providing (S30) the sample holder frame (30) with the at least one receiving element (32) and placing the sample fixing plate (20) inserted into the first sample holder (10) in the at least one receiving element (32), thereby assembling the plate assembly (1), connecting (S40) one or more of the at least two opposite sample fixing plate magnets (24) of the sample fixing plate (20) and one or more of the at least two holder frame magnets (35) of the sample holder frame (30) to stably fix the plate assembly (1), inverting (S50) the plate assembly (1) in such a way that the cuvettes (11) of the first sample holder element (10) filled with samples (12) face upwards, and illuminating (S60) the plate assembly (1) from below with a light-sheet microscope for examining the samples (12).

9. The method according to claim 8, further comprising first filling individual ones of the plurality of cuvettes (11) of the first sample holder (10) with a mounting medium, cell culture medium, and/or hydrogel, and then filling with the sample (12).

10. The method according to claim 8, further comprising filling individual ones of the plurality of cuvettes (11) of the first sample holder (10) with the sample (12) stored in a mounting medium, cell culture medium, and/or hydrogel, manually or with a pipetting robot.

11. The method according to claim 8, wherein the sample (12) is a 3-dimensional cell culture or tissue sample.

12. The method according to claim 8, further comprising simultaneously using several of the at least one receiving elements (32) of the sample holder frame (30) for continuous examination of the samples (12), without recalibration of the light-sheet microscope.

13. The method according to claim 8, wherein each individual chamber (22, 42) formed in the cuvettes (11) of the first sample holder (10) is configured to receive a sample (12) and a mounting medium, cell culture medium and/or hydrogel together, further comprising the step of:

before inverting the plate assembly (1), sliding and stably securing fixing tabs of the sample fixing plate (20) and/or grid clamping element (50) into L-shaped grooves (37) formed on side walls (36) of the sample holder frame (30) (S41 or S510).

14. The method according to claim 8, comprising the step of producing any of the first sample holder (10) from a FEP (fluorinated ethylene propylene) foil by vacuum forming.

15. The plate assembly (1) according to claim 1, further comprising a second sample holder (40), which is a transparent foil sheet and comprises a plurality of second cuvettes (41), individual ones of the plurality of second cuvettes (41) being insertable into a respective one of the cuvettes (11) of the first sample holder (10) in such a way that a second chamber (42) is formed between the first sample holder (10) and the second sample holder (40) in an individual one of the cuvettes (11), the chamber second (42) being configured to ensure integrity of the structure of the single sample (12) in the respective individual one of the cuvettes (11) of the first sample holder (10), and wherein the individual ones of the plurality of second cuvettes (41) of the second sample holder (40) is configured to receive individual inserts (21) of the sample fixing plate (20).

16. The plate assembly (1) according to claim 15, wherein the first sample holder (10) and the second sample holder (40) are a transparent foil sheet selected from at least one of the group consisting of: ECTFE foil (ethylene-chlorotrifluoroethylene), THV foil (tetrafluoroethylene-hexafluoropropylene-vinylidene fluoride), PFA foil (perfluoroalkoxy), PFA-PG foil, PFA-GK foil, PTFE (polytetrafluoroethylene, Teflon) foil, especially FEP foil, wherein a thickness of the foil sheet is between 25-100 μm, and wherein the first sample holder (10) and second sample holder (40) are formed by vacuum forming.

17. A method of using of the plate assembly (1) according to claim 15, comprising the steps of:

providing (S100) the first sample holder (10) and filling the plurality of cuvettes (11) with a sample (12) stored in mounting medium, cell culture medium, and/or hydrogel, providing (S200) the second sample holder (40) and inserting the plurality of second cuvettes (41) into respective ones of the cuvettes (11) of the first sample holder (10) containing samples (12), thereby the second chamber (42) is formed, which has a volume that ensures the integrity of the structure of the single sample (12), providing (S300) the sample fixing plate (20) and inserting individual ones of the plurality of inserts (21) into individual ones of the plurality of second cuvettes (41) of the second sample holder (40), providing (S400) the sample holder frame (30) having the at least one receiving element (32) and placing the first sample holder (10), the second sample holder (40), and the sample fixing plate (20) in the at least one receiving element (32), which are aligned one after the other, thereby assembling the plate assembly (1), connecting (S500) one or more of the at least two opposite sample fixing plate magnets (24) of the sample fixing plate (20) and one or more of the at least two holder frame magnets (35) of the sample holder frame (30) to stably fix the plate assembly (1), inverting (S600) the plate assembly (1) in such a way that the cuvettes (11) of the first sample holder element (10) filled with samples (12) face upwards, and illuminating (S700) the plate assembly (1) from below with a light-sheet microscope for examining the samples (12).

18. A method of using the plate assembly (1) according to claim 1, comprising the steps of:

providing (S7) the first sample holder (10) and sterilizing it, filling (S8) individual ones of the plurality of cuvettes (11) of the sterilized first sample holder (10) with sample-forming material (9), placing (S9) the first sample holder (10) in an incubator, wherein the individual ones of the plurality of cuvettes (11) of which are filled with sample-forming material (9), until obtaining a sample (12), and sequentially performing steps comprising:

providing (S10) the first sample holder (10) and filling the plurality of cuvettes (11) with a sample (12) stored in mounting medium, cell culture medium, and/or hydrogel, providing (S20) the sample fixing plate (20) and inserting individual ones of the plurality of inserts (21) into individual ones of the plurality of cuvettes (11) of the first sample holder (10) containing samples (12), thereby forming the chamber (22) having a volume that ensures integrity of the structure of the single sample (12), providing (S30) the sample holder frame (30) with the at least one receiving element (32) and placing the sample fixing plate (20) inserted into the first sample holder (10) in the at least one receiving element (32), thereby assembling the plate assembly (1), connecting (S40) one or more of the at least two opposite sample fixing plate magnets (24) of the sample fixing plate (20) and one or more of the at least two holder frame magnets (35) of the sample holder frame (30) to stably fix the plate assembly (1), inverting (S50) the plate assembly (1) in such a way that the cuvettes (11) of the first sample holder element (10) filled with samples (12) face upwards, and illuminating (S60) the plate assembly (1) from below with a light-sheet microscope for examining the samples (12).

19. The method according to claim 18, wherein the sample-forming material (9) comprises single cells in a cell culture medium or hydrogel, or one or more small cell aggregates and wherein the sample (12) is a 3-dimensional cell culture of living cells.

20. The method according to claim 18, wherein steps S7-S9 are performed in a sterile environment.

* * * * *